(12) United States Patent
Torres Delgado et al.

(10) Patent No.: US 11,090,741 B2
(45) Date of Patent: Aug. 17, 2021

(54) HIGH EFFICIENCY SAW CHAIN

(71) Applicant: Oregon Tool, Inc., Portland, OR (US)

(72) Inventors: Roberto de Jesus Torres Delgado, Portland, OR (US); James Matthew Cunnington, Tualatin, OR (US); Sam Hutsell, Portland, OR (US); Michael D. Harfst, Milwaukie, OR (US)

(73) Assignee: Oregon Tool, Inc., Portland, OR (US)

( * ) Notice: Subject to any disclaimer, the term of this patent is extended or adjusted under 35 U.S.C. 154(b) by 0 days.

(21) Appl. No.: 16/795,144

(22) Filed: Feb. 19, 2020

(65) Prior Publication Data

US 2020/0180053 A1    Jun. 11, 2020

Related U.S. Application Data

(63) Continuation-in-part of application No. 15/975,343, filed on May 9, 2018, now abandoned.

(60) Provisional application No. 62/503,819, filed on May 9, 2017.

(51) Int. Cl.
*B23D 57/02* (2006.01)

(52) U.S. Cl.
CPC .................... *B23D 57/02* (2013.01)

(58) Field of Classification Search
CPC ...... B23D 57/02; B27B 33/145; B27B 33/141
See application file for complete search history.

(56) References Cited

U.S. PATENT DOCUMENTS

| | | | |
|---|---|---|---|
| 2,792,035 A | 4/1955 | Aumann | |
| 3,263,717 A | 8/1966 | Silvon | |
| 3,929,049 A | 12/1975 | Graversen | |
| 4,074,604 A | 2/1978 | Goldblatt et al. | |
| 4,203,215 A * | 5/1980 | Ochiai | B27B 33/144 30/383 |
| 4,353,277 A | 10/1982 | Silvon | |
| 4,459,890 A | 7/1984 | Dolata et al. | |
| 4,702,139 A | 10/1987 | Nagashima | |
| 4,756,221 A | 7/1988 | Nitschmann et al. | |
| 4,785,700 A | 11/1988 | Petrovich et al. | |
| 4,924,609 A | 5/1990 | Martin | |
| 6,374,716 B1 | 4/2002 | Weber et al. | |
| 6,837,138 B2 | 1/2005 | Mang | |
| 6,871,573 B2 | 3/2005 | Mang | |
| 7,836,808 B2 * | 11/2010 | Szymanski | B27B 33/144 83/833 |
| 8,146,474 B2 * | 4/2012 | Szymanski | B27B 33/144 83/831 |
| 8,256,335 B1 | 9/2012 | Canon | |
| 8,342,163 B2 | 1/2013 | Osborne et al. | |
| 2008/0098870 A1 | 5/2008 | Goettel et al. | |

(Continued)

FOREIGN PATENT DOCUMENTS

| | | |
|---|---|---|
| CN | 101588887 A | 11/2009 |
| CN | 202291652 U | 7/2012 |

(Continued)

*Primary Examiner* — Omar Flores Sanchez
(74) *Attorney, Agent, or Firm* — Schwabe, Williamson & Wyatt, P.C.

(57) ABSTRACT

A high efficiency saw chain for a saw including a cutting link and a drive link, the cutting link and a drive link selected to provide a high efficiency saw chain for a specified power range, based on ratios of components of the chain, such as the ratio of the height of the cutter to the pitch of the chain.

12 Claims, 5 Drawing Sheets

(56) References Cited

U.S. PATENT DOCUMENTS

| | | |
|---|---|---|
| 2011/0179652 A1 | 7/2011 | Förenbach et al. |
| 2013/0112057 A1 | 5/2013 | Osborne et al. |
| 2014/0090631 A1 | 4/2014 | Michelon |
| 2016/0136837 A1 | 5/2016 | Szymanski |

FOREIGN PATENT DOCUMENTS

| | | |
|---|---|---|
| EP | 2389281 B1 | 11/2011 |
| JP | 56-105902 A | 8/1981 |
| JP | 62-105602 A | 5/1987 |
| JP | 2014-210365 A | 11/2014 |
| WO | 2008/052053 A2 | 5/2008 |
| WO | 2009/026497 A2 | 2/2009 |

\* cited by examiner

HIGH EFFICIENCY SAW CHAIN

RELATED APPLICATION

This application claims priority to, and is a Continuation-in-Part of, U.S. patent application Ser. No. 15/975,343, filed on May 9, 2018, which claims priority to U.S. Provisional Application No. 62/503,819, filed on May 9, 2017, the entireties of which are hereby incorporated by reference.

TECHNICAL FIELD

The present disclosure relates to the field of saw chains, and specifically to a high efficiency saw chain.

BACKGROUND

Chain saws typically include a housing containing a driving device (e.g., an engine), a guide bar extending from the housing, and an endless saw chain that is driven by the driving device and disposed to articulate around the perimeter of the guide bar. The saw chain generally includes various inter-coupled links, such as cutter links, drive links, and tie straps. Cutter links may be provided with a depth gauge in front of and slightly below a following cutting edge to substantially inhibit the cutter from taking an excessive bite or penetration into the wood.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments disclosed herein provide an improved high efficiency saw chain for use in lower power chainsaw operation, such as hand held power chainsaws. Through careful design and experimentation, the inventors have selected various parameters of the saw chain to provide a chain with high cutting efficiency relative to prior cutting chain designs (see, for example, FIG. 5). This results in a saw chain that requires less energy and/or power to accomplish the same cut as a traditional typical saw chain.

Parameters (also referred to as factors) may be manipulated in designing a saw chain and may be used to adjust either power consumption or cutting efficiency. Many factors influence both power consumption and efficiency. Typically, in a clean sheet design, a target power consumption value is set, along with some other system variables, such as, system weight, desired feed load, system RPM and other factors related to the cutting system as a whole. The target power level affects the first factor decision, which is the pitch chosen for the chain. Pitch and power are positively correlated, in that a larger pitch results in a higher power level needed and vice versa. Once the pitch is chosen, the remaining chain factors are sized to provide appropriate ratios between many of the interrelated factors of the chain and bar system. These factors may include cutter height and length, drive link pitch to cutter pitch ratio, material thickness, cut kerf width, and bar to kerf clearance. In embodiments, the cut kerf width is selected to be between about 0.200 and about 0.230 inches. In embodiments, the bar to kerf clearance is selected to be between about 0.060 and about 0.100 inches. Additional cutter design elements that affect specific cutting modes include depth gauges, cutting corner radius, fixed cutting angles, and filed cutting angles. A result of this need to keep multiple factors and factor ratios near their optimum is that typical chain designs have evolved into a relatively narrow design space that yields a fair amount of visual similarity between designs. However, many factors are not linear in their influence on the cutting system efficiency or some other measure of performance. The inventors have unexpectedly discovered an unexpected region of high efficiency through careful manipulation of these design factors.

One ratio that is nonlinear is the feed load/depth gauge ratio. As disclosed herein a high efficiency saw chain has been developed in which the entire chain is scaled into a window that allows the majority of the influential dimensions and ratios to be near their optimums while placing the feed load/depth gauge ratio and depth-of-cut to maximum depth-of-cut ratio at their optimum points. This scale size targets an efficiency optimum and the correct area above a point of inflection in the feed load/depth gauge relationship while simultaneously holding the feed load and power range at a fixed value. This design space provides performance characteristics that cannot be extrapolated from linear scaling or from modifying one dimension on an existing design to move a given response value, like power or efficiency.

Figure 5:
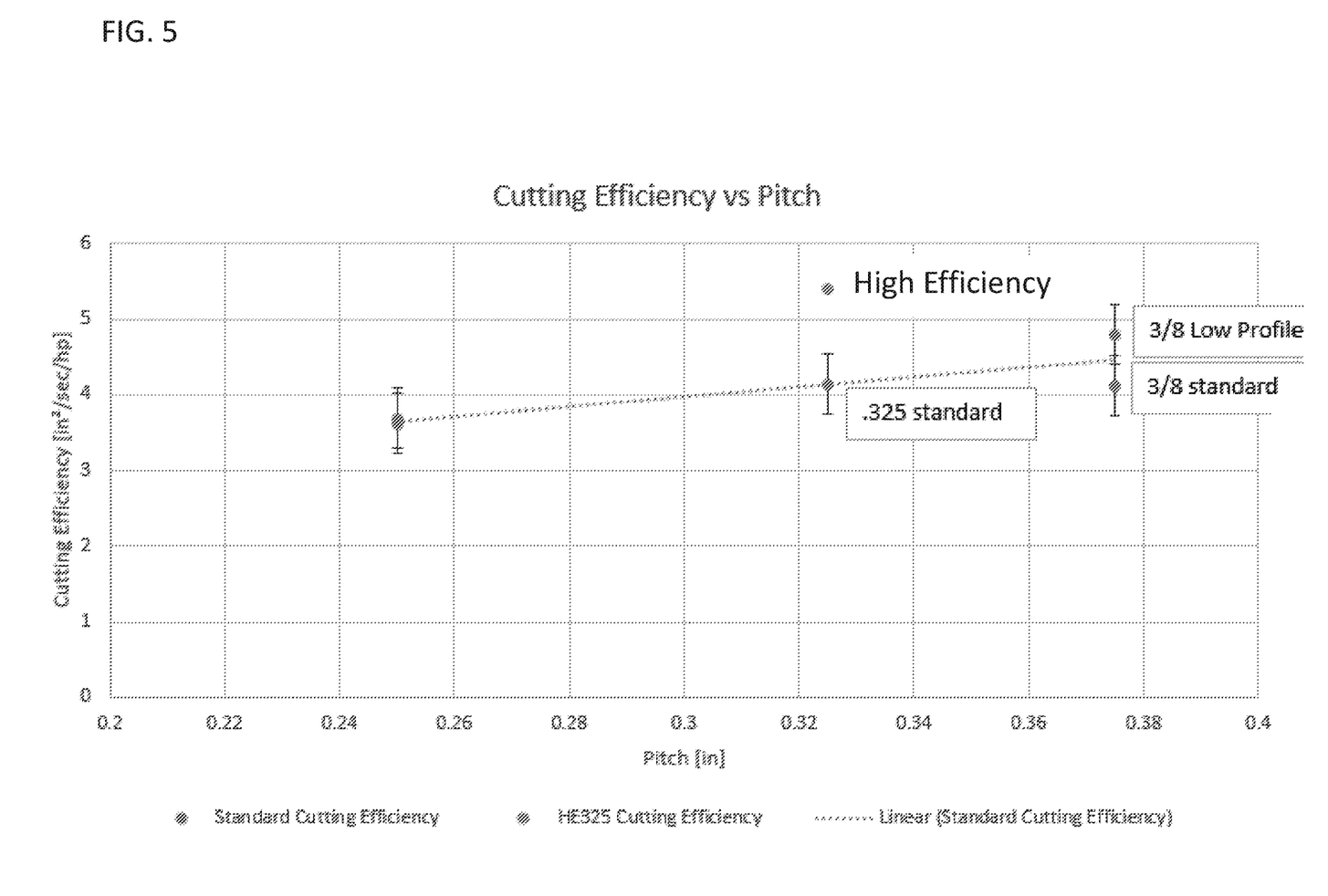
FIG. 5 is a graph of cutting efficiency vs. chain pitch demonstrating the unexpected superior performance of a disclosed high efficiency cutting chain relative to prior cutting chain designs.
Figure 6:
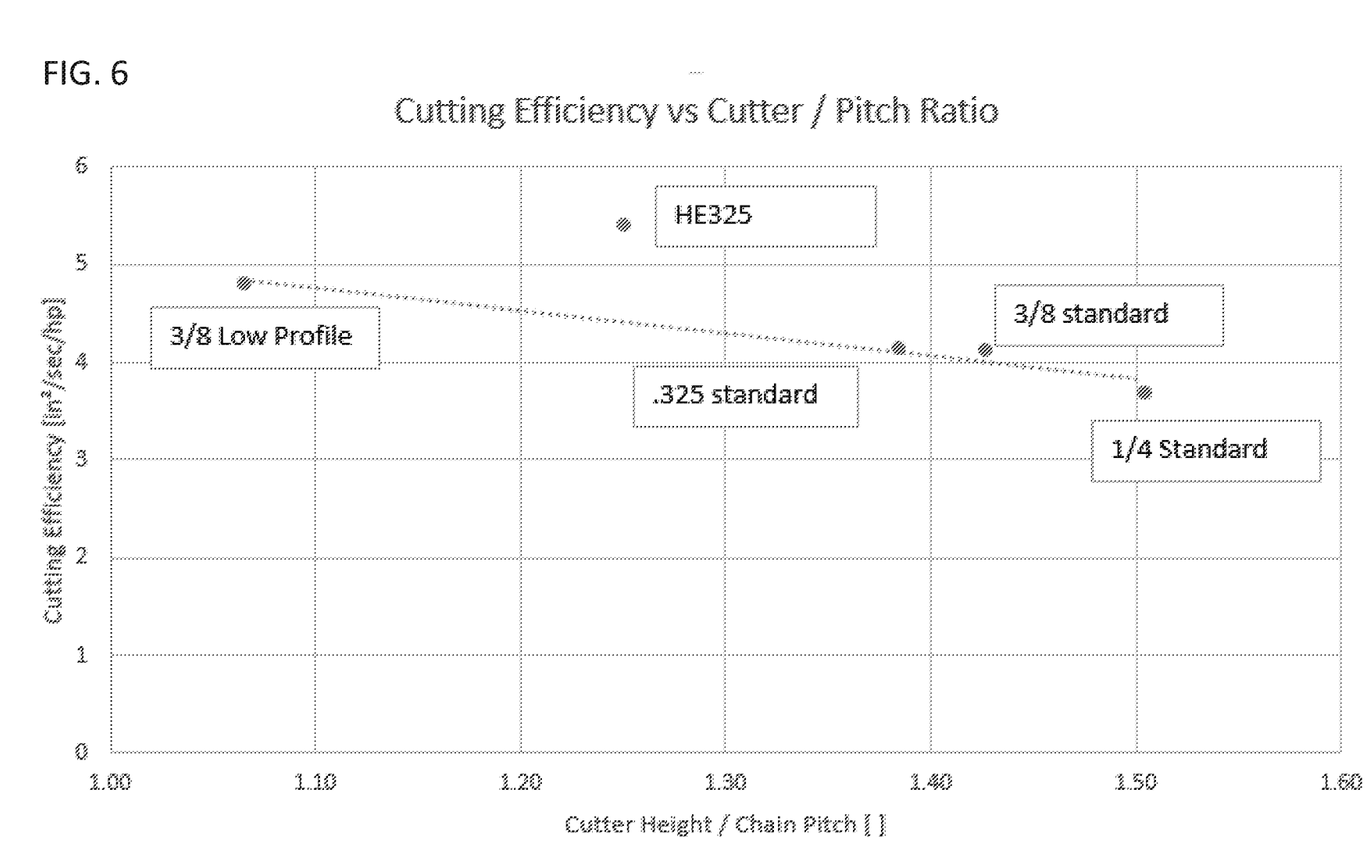
FIG. 6 is a graph of cutting efficiency vs. chain cutter height to chain pitch ratio demonstrating the unexpected superior performance of a disclosed high efficiency cutting chain relative to prior cutting chain designs.

As shown in FIGS. 5 and 6, the selection of various factors results in a saw chain (High Efficiency) that is far greater than expected for a comparable pitch chain (0.325 standard). The graph shown in FIG. 5 illustrates the relationship between pitch and cutting efficiency. Extrapolating linearly from ¼ pitch to ⅜ pitch, one would not predict the efficiency of a disclosed high efficiency cutting chain. Even applying the offset between standard ⅜ and ⅜ low profile, one would still not predict the cutting efficiency of the present high efficiency cutting chain.

The graph shown in FIG. 6 illustrates the relationship between a cutter height to pitch ratio and cutting efficiency. As shown in FIG. 6, standard ⅜, standard ¼, standard 0.325 chain and even ⅜ low profile chain show a linear relationship between cutting efficiency and the cutter height pitch ratio. However, a disclosed high efficiency chain exhibits an unexpectedly superior increase on efficiency. This cutting efficiency results from designing a disclosed high efficiency cutting chain for a specific application (power range and feed load) instead of designing a generic chain intended for use on several applications. In an embodiment, a high efficiency chain as defined herein may operate in a power level range of 1 to 3 horsepower, with 5 to 8 pounds of user applied feed load at 2 horsepower.

In embodiments, the feed load to depth gauge setting ratio for a high efficiency saw chain is between about 330 and about 380. This compares favorably to a feed load to depth gauge setting ratio for a conventional saw chain, which is between about 250 and about 310. In embodiments, the depth gauge setting for a high efficiency saw chain is between about 0.015 and about 0.020 inches. This compares favorably to a depth gauge setting for a conventional saw chain, which is between about 0.020 and about 0.030.

In various embodiments, a chainsaw may include a guide bar extending from a body of the chainsaw. The body may include a housing, with a motor disposed inside the housing to drive the saw chain around the guide bar. The guide bar may include a pair of rails, with a groove disposed between the rails. The guide bar may include one or more sprockets at ends of the guide bar, with elongate portions (e.g., straight portions or portions with a slight curvature) disposed between the ends of the guide bar. For example, the guide bar may include a drive sprocket at a proximal end of the guide bar and/or a nose sprocket at a distal end of the guide bar.

In various embodiments, the saw chain may include a plurality of links coupled to one another, including one or more cutting links, drive links and/or tie straps. The links may include a pair of rivet holes (e.g., a front rivet hole and a rear rivet hole) to couple the links to respective adjacent links. The drive links may be center links that ride in the groove of the guide bar and/or engage with a pocket of the sprockets. The tie straps may be side links (e.g., left-side links or right-side links) that engage with one of the rails of the guide bar. The tie straps may couple successive drive links to one another (e.g., using rivets disposed through the rivet holes of the tie straps and/or drive links, or via another arrangement/coupling).

A disclosed high efficiency cutting chain may include cutter/cutting links, tie straps, and drive links. The cutting link of the saw chain includes a forward cutting link rivet hole, and a rearward cutting link rivet hole and an upper cutting edge disposed at a first height relative to a line colinear with the lowermost portion of the cutters, and parallel with a longitudinal centerline bisecting the center of the rivet holes. In embodiments, the first height is between about 0.400 and about 0.412 inches. The cutting link may include a cutting edge and a depth gauge separated by a gullet. The depth gauge may have an upper surface and a rear face that generally faces the gullet and opposes the cutting edge. The depth gauge has an upper surface disposed at a second height relative to the line colinear with the lowermost portion of the cutters generally at or below the first height, i.e. the height of the upper cutting edge. In embodiments, a ratio between the first height and the second height is selected to provide for a high efficiency saw chain. Cutting performance, safety, and vibration are controlled with the ratio of the cutter height to depth gauge height above a line colinear with the lowermost portion of the cutters. In embodiments, the ratio between the first height and the second height is selected to provide for a high efficiency saw chain is between about 1.05 and about 1.10.

Cutter height may also be identified with respect to a longitudinal centerline disposed through the middle of adjacent rivet holes. The distance between the cutter height and the longitudinal centerline may be referred to as the third height.

The cutter link may be coupled with drive links with, for example, a rivet passing through the forward cutting link rivet hole and the rearward drive link rivet hole. A drive link may include a forward drive link rivet hole and a rearward drive link rivet hole, the drive link coupled to the cutting link via a rivet engaging the forward cutting link rivet hole and the rearward drive link rivet hole and a rivet engaging the rearward cutting link rivet hole and the forward drive link rivet hole of a trailing drive link.

Generally, the pitch of the chain is the distance between three successive rivets divided by two. The ratio of pitch to cutter height is determined by the specified power range. For a disclosed high efficiency cutting chain, a chain pitch may be defined as half a distance between a center of the forward drive link rivet hole and the rearward cutting link rivet hole. In embodiments, a ratio between the first height and the chain pitch is selected to provide a high efficiency cutting chain for the specified power range. In embodiments, the ratio between the first height and the chain pitch is between about 1.22 and about 1.28. In embodiments, the chain pitch is between about 0.315 and about 0.335 inches. In other embodiments, the ratio between the third height and the pitch is between about 0.86 and about 0.92, where the third height is between about 0.285 and about 0.295 inches.

In embodiments, the cross sectional area of a cutter link and tie strap around the rivets is sized to provide a tensile strength and safety factor that is based on the power range for which it is designed. Lower power chains require less material to provide the needed strength. In embodiments, the cross sectional area below the center line of the rivet holes is larger than the area above the centerline to the chain footprint. This allows wear of the cutter and chassis footprint during use while still maintaining appropriate tensile strength and safety. In addition, in certain embodiments, the height of the cutter link to the top of the tie straps is sized to provide an open area for the chip to exhaust appropriately.

A cutting link pitch is defined as the distance between a center of the forward cutting link rivet hole and a center of the rearward cutting link rivet hole. A cutter drive pitch is defined as the distance between a center of the forward drive link rivet hole and a center of the rearward drive link rivet hole. In embodiments, a ratio of the cutter link pitch and the drive link pitch is selected to provide for a high efficiency saw chain. In embodiments, the ratio of the cutter link pitch and the drive link pitch is between about 1.15 and about 1.19. In embodiments, cutter link pitch is between about 0.345 and about 0.355. In embodiments, the drive link pitch is between about 0.288 and about 0.308.

The gauge of a saw chain is typically measured by the thickness of the drive links. In certain embodiments, a disclosed saw chain has been designed to provide a chain gauge that is not as thick as typical chain without sacrificing chain strength. This, coupled with other features may provide for a saw chain with increased efficiency. In embodiments, a disclosed saw chain has been designed to provide a chain gauge width between about 0.040 and about 0.046.

In certain embodiments, optimization is made to the cutters of the saw chain to provide for an increase in cutting efficiency and hence the efficiency of the saw chain. For example, in various embodiments (i.e., those having a positive difference between the sharpened width and the opening width) may improve efficiency. These geometric constraints may provide performance improvements to any suitable form of hooded cutter link. Examples of suitable cutters can be found in U.S. Pat. No. 9,610,702, which is hereby incorporated herein by reference in its entirety.

Embodiments disclosed herein may improve cutting performance without sacrificing the expected lifetime of a cutter link. This lifetime is typically determined by the number of sharpenings (e.g., with a round, pencil-like file) that a cutter link can endure before the sharpened surface recedes too far for the cutter link to be useful. Conventionally, the thickness of the sharpened surface was increased to nominally extend the lifetime of a cutter link without any regard for the relative geometries of the cutter link (and the attendant effects on cutting performance). These geometries may enable cutter links to maintain a "thick" sharpened surface that can withstand repeated sharpenings while achieving some or all of the performance improvements described herein. Performance advantages may be seen for cutter links of any suitable dimensions having a sharpened width greater than an opening width.

Embodiments of chain saw cutter links, and related apparatuses and methods, are disclosed herein. The cutter links described herein may improve chain saw cutting performance by cutting through the desired media (e.g., wood) more quickly and smoothly than conventional cutter links. In particular, the cutter links herein may improve the cutting efficiency of a chain saw, a measure that quantifies the ability of the saw chain to convert the power provided by the saw into the speed of a cut and the removal of material.

In some embodiments, a high efficiency saw chain includes a bumper drive link. In embodiments, a bumper drive link has a rearward extended trailing guard, or bumper portion of the drive link. The bumper portion of the drive link may be positioned alongside a depth gauge of a cutting link that shares a common pivotal connection with the drive link. A double thickness of depth gauge and tail may be formed and may more effectively resist penetration into the wood fibers of the kerf bottom (as compared to an elongated single thickness) and may substantially enhance the resistance to excessive penetration of the following cutting link. When the chain traverses the nose portion of a chain saw bar, articulation between the bumper drive link and the following cutter link effectively create an elongation of the depth gauge (for example as a composite of the cutter link depth gauge and the bumper portion of the bumper drive link). This extended composite depth gauge provides stability to the chain, and, as briefly touched on above, it also aids in inhibiting the cutting surface from biting or penetrating too far into the uncut wood. These functions may contribute to decreasing possible kickback.

In various embodiments, the bumper portion of the bumper drive link provides further resistance to penetration of the wood fibers, while minimizing negative effects on cutting performance by minimizing that portion of the bumper drive link that extends into the gullet of the cutting link, or in other words helping to maximize the gullet opening for enhanced chip flow. In various embodiments, the configuration of the leading and trailing portions of the bumper drive link may be cooperatively formed so that the ramp of the leading portion ramps the wood being cut in a direction that projects above the leading edge of the trailing portion, the leading edge of the trailing portion being itself shaped to avoid presenting a corner that might dig into the kerf, while the tail of the trailing portion may be formed to provide an extended edge along the top of the trailing portion. In various embodiments, the drive link may also be relieved in a center area forward of the trailing portion of the center link to provide added chip carrying capacity.

Disclosed is a system including a high efficiency saw chain and a drive sprocket configured to drive the high efficiency saw chain. In embodiments, the system further includes a guide bar configured to guide the high efficiency saw chain.

Disclosed is a powered saw including a high efficiency saw chain. In embodiments, the powered saw further includes a drive sprocket configured to drive the high efficiency saw chain. In embodiments, the powered saw further includes a guide bar configured to guide the high efficiency saw chain.

Figure 1:
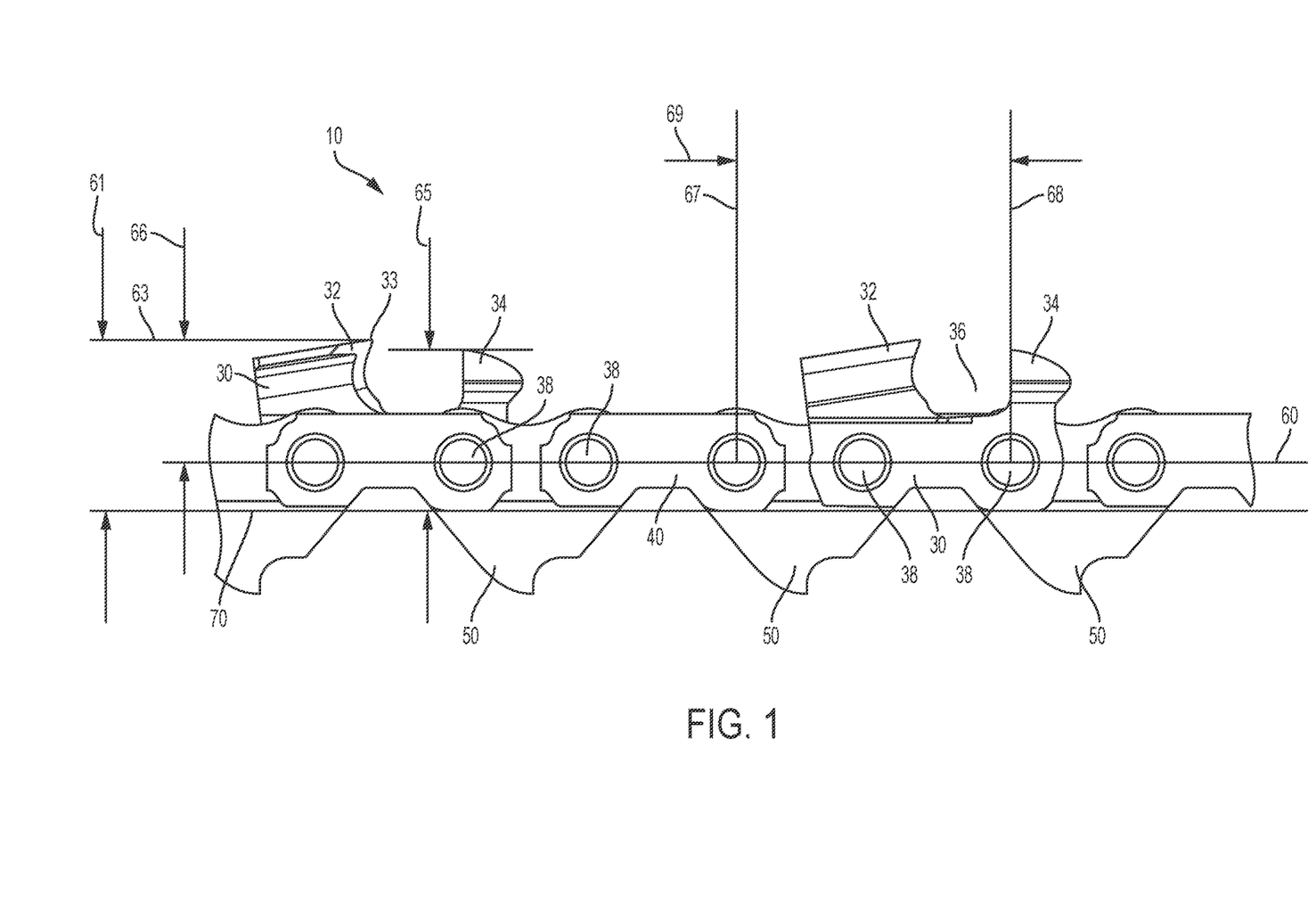
FIG. 1 illustrates a side view of a high efficiency cutting chain in accordance with various embodiments.

FIG. 1 illustrates a high efficiency cutting chain 10 according to various embodiments. The high efficiency cutting chain 10 also includes cutter links 30, tie straps 40 and drive links 50. The cutter link 30 of the saw chain 10 includes a cutting edge 32 and a depth gauge 34 separated by a gullet 36. The depth gauge 34 may have an upper surface and a rear face that generally faces gullet 36. The cutter link 30 may be coupled with a drive link 50 with, for example, a rivet passing through rivet holes 38.

A longitudinal lower line 70 that is colinear with the lowermost portion of the cutters is shown in FIG. 1. A longitudinal centerline 60 may be disposed through the middle of adjacent rivet holes 38.

A line 63 parallel to the longitudinal centerline 60 and to lower line 70 may be disposed at the top corner 33 of the cutting surface 32 of the cutter 30. The distance between the lower line 70 and the parallel line 63 can be used to define cutter height 61, which is referred to above as the first height. The distance between the center line 60 and the parallel line 63 can be used to define cutter height 66, which is referred to above as the third height. The cutter height has been selected to provide a high efficiency cutting chain 10.

The distance between the lower line 70 and the parallel line at the surface of depth gauge 34 can be used to define the depth gauge height, which is referred to as the second height 65.

In embodiments, the cross sectional area below the center line 60 is larger than the area above the centerline to the chain footprint. This allows wear of the cutter and chassis footprint during use while still maintaining appropriate tensile strength and safety. In addition, in certain embodiments, the height of the cutter from line 66 to the top of the tie straps is sized to provide an open area for the chip to exhaust appropriately. A second set of center lines 67 and 68 perpendicular to the longitudinal first centerline 60 may be disposed through rivet holes 38 and used to define a distance 69 between three rivets. The pitch of the chain is the distance between three successive rivets divided by two. Thus, the pitch is the distance 69 divided by two. In embodiments, the ratio between the cutter height and the pitch has been selected to provide a high efficiency cutting chain 10 for the specified power range. In embodiments, the ratio between the height and depth gauge setting has been selected to provide for a high efficiency saw chain. The ratio of pitch to cutter height is determined by the specified power range. Cutting performance, safety, and vibration are controlled with the ratio of the cutter height to depth gauge height above the rivet centerline.

Figure 2:
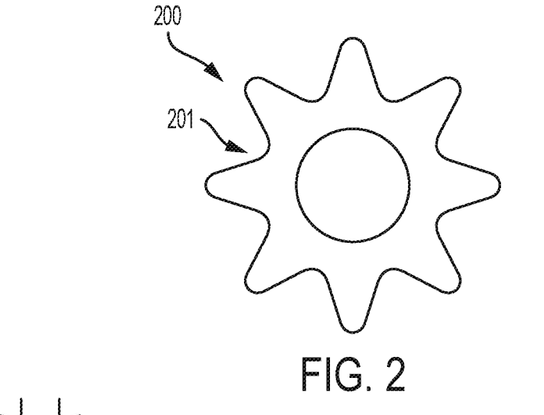
FIG. 2 illustrates a side view of a drive sprocket for a high efficiency cutting chain in accordance with various embodiments.

FIG. 2 illustrates a drive sprocket 200 matched to the chain of FIG. 1. In embodiments, the gullet 201 of the sprocket 200 is matched to the pitch distance of the cutting chain 10 of FIG. 1.

Figure 3:
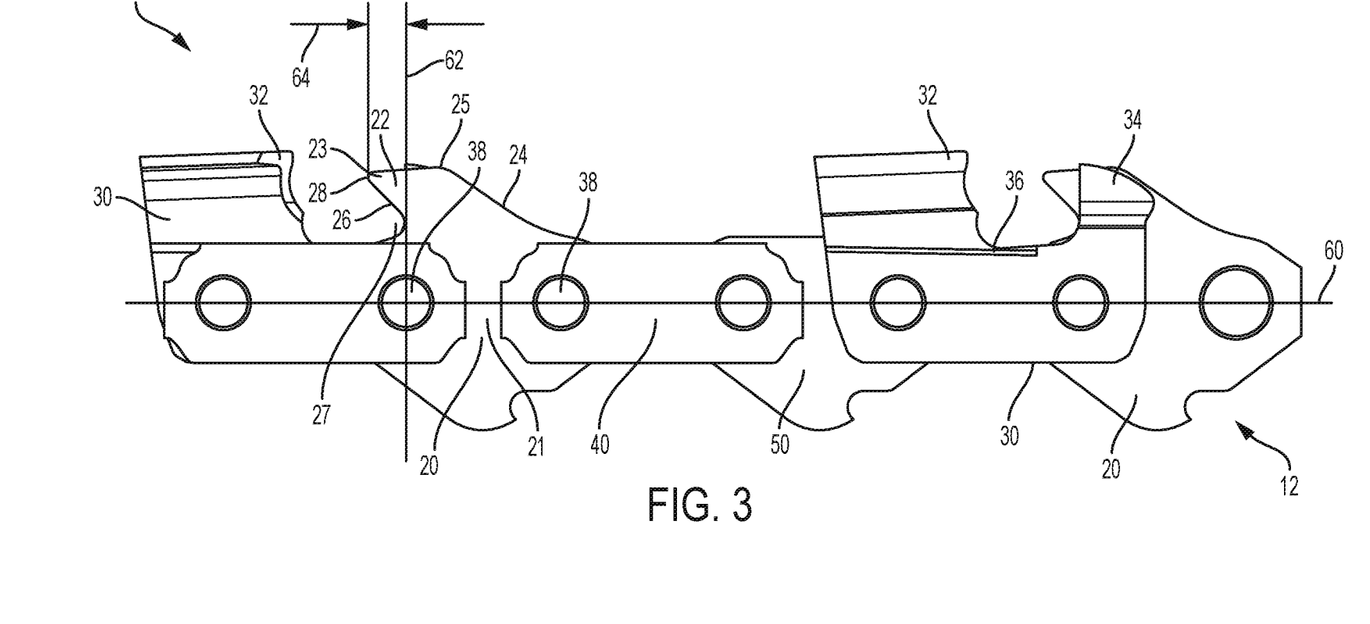
FIG. 3 illustrates a side view of a high efficiency cutting chain in accordance with various embodiments.
Figure 4:
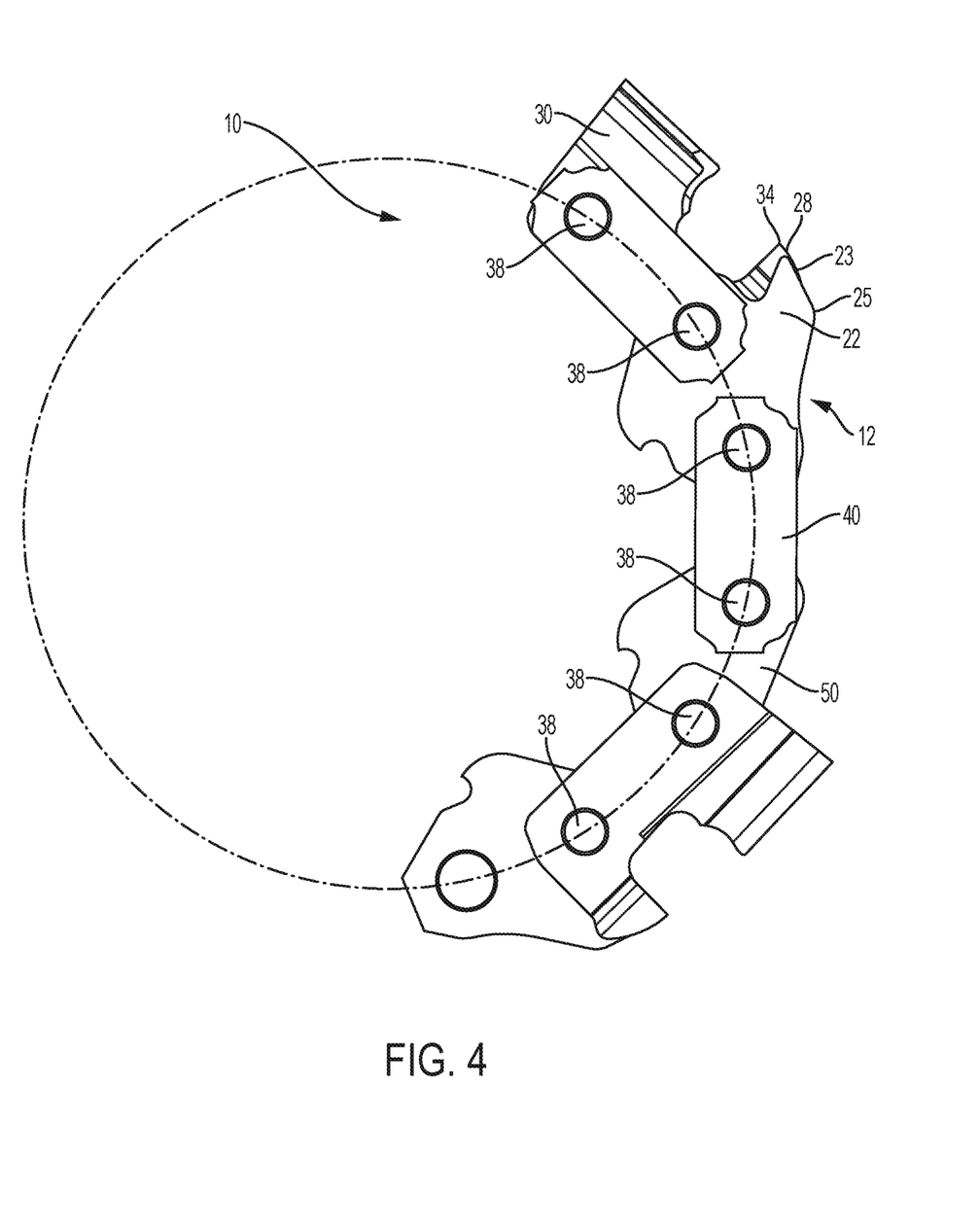
FIG. 4 illustrates a side view of a high efficiency cutting chain in accordance with various embodiments.

FIGS. 3 and 4 illustrate a high efficiency cutting chain 10 that includes a bumper drive link 20, according to various embodiments. The high efficiency cutting chain 10 includes cutter links 30, ties straps 40 and, in certain embodiments, non-bumper drive links 50. The cutter link 30 of the saw chain 10 includes a cutting edge 32 and a depth gauge 34 separated by a gullet 36. The depth gauge 34 may have an upper surface and a rear face that generally faces gullet 36. The cutter link 30 may be coupled with a bumper drive link 20 with, for example, a rivet passing through rivet holes 38. The bumper drive link 20 includes a body portion 21 and a bumper portion 22, which extends or projects both radially upward and rearward from the center of the body portion 21 of the bumper drive link 20. The bumper portion 22 may reduce kickback by extending somewhat radially as it traverses the nose of a chain saw bar (see FIG. 4). In addition, the bumper portion 22 may increase the surface area of the bumper drive link 20 that may be engaged in a kickback event thus reducing kickback energies. In addition, the length and shape of the bumper portion 22 may be modified to drive cutting performance.

FIG. 3 shows the side view of saw chain 10 showing the cutting link 30 and bumper drive link 20 and illustrating a respective first position 12 of a saw chain 10 in accordance with various embodiments. FIG. 4 shows the side view of saw chain 10, the cutting link 30, and bumper drive link 20 and illustrating a respective second position 14 of a saw chain 10 in accordance with various embodiments. The cutter link 30 and the bumper drive link 20 may be in a first position 12 while traversing on a generally straight run of a bar rail of a bar and may be in the second position 14 while traversing circumferentially around a nose of the bar. In some embodiments, the height of a top edge 23 of the bumper portion 22 may be less than the height of an upper surface of a depth gauge 34, when such components are traversing the straight runs of the upper and lower bar rails of a guide bar. In certain examples, the height of a top edge 23 of the bumper portion 22 can be low enough so that the bumper drive link is effectively a regular drive link. In certain examples, the height of a top edge 23 of the bumper portion 22 can be as high as the depth gauge. In certain examples, the height of a top edge 23 of the bumper portion 22 is between about 0.005" higher and about 0.030" lower than the depth gauge.

In various embodiments, the bumper drive link 20 may include bumper portion 22 that is adapted to extend partway into the upper region of the gullet 36. The bumper portion 22 may have a top edge 25, which in some embodiments may be lower than the upper surface of depth gauge 34 while in the first position 12. The bumper drive link 20 may have a concavity 27 on a trailing edge 26 with a top portion 28, and may include a forward most portion 24 disposed below and in front of a tip 25 of the bumper portion 22. In embodiments, the distance between the longitudinal first centerline 60 and the tip 25 is greater than the distance between the longitudinal first centerline 60 and the top portion 28 of the trailing edge 26 when the chain 10 is in the first position 12 as it traverses the straight part of the bar. In various embodiments, the concavity 27 is sized to reduce the amount of drive link material that protrudes into the gullet 36 of the cutter link, which in turn reduces the impact on the flow of chips through the gullet 36 promoting better cutting performance. A second line 63 parallel to the longitudinal first centerline 60 may be disposed at the top corner 33 of the cutting surface 35 of the cutter 30. The distance between the first center line 60 and the parallel line 63 can be used to define cutter height 66. The cutter height has been selected to provide a high efficiency cutting chain 10. A second set of center lines 67 and 68 perpendicular to the longitudinal first centerline 60 may be disposed through rivet holes 38 and used to define a distance 69 between three rivets. The pitch of the chain is the average distance between two rivets. As the distance between rivets varies, the pitch can be measured by measuring between three rivets and dividing this distance by two. Thus, the pitch distance is the distance 69 divided by two. In embodiments, the ratio between the cutter height and the pitch distance has been selected to provide a high efficiency cutting chain 10. In embodiments, the angle of the forward most portion 24 is between about 35-70°, measured from line 60. In embodiments, the top edge 23 of the bumper portion 22 of the bumper drive link 20 slopes downward from the tip 25 to the top portion 28 of the trailing edge 26. In embodiments, the top edge 23 of the bumper portion 22 of the bumper drive link 20 slopes downward at between about −3° (sloping upward) to 8° (sloping downward), for example 4.6° measured from line 60. A longitudinal first centerline 60 may be disposed through adjacent rivet holes 38. In embodiments, the distance between the longitudinal first centerline 60 and the tip 25 is greater than the distance between the longitudinal first centerline 60 and the top portion 28 of the trailing edge 26 when the chain 10 is in the first position 12 as it traverses the straight part of the bar. In various embodiments, the concavity 27 is sized to reduce the amount of drive link material that protrudes into the gullet 36 of the cutter link, which in turn reduces the impact on the flow of chips through the gullet 36 promoting better cutting performance. A second center line 62 perpendicular to the longitudinal first centerline 60 may be disposed through rivet hole 38. The second center line 62 can be used to define a tail extension distance 64. In embodiments, the tail extension distance 64 is between about 17-23% (such as about 20%) of the distance between the rivet holes 38 of cutter link 20.

In various embodiments, the concavity 27 is sized to reduce the amount of drive link material that protrudes into the gullet 36 of the cutter link, which in turn reduces the impact on the flow of chips through the gullet 36 promoting better cutting performance. In some embodiments, as the bumper portion 22 traverses the nose, the bumper portion 22 may substantially align (e.g. extend radially from the center of the nose) with the upper surface of depth gauge 34 at its point of greatest radial extension. Such alignment may present a larger surface area relative to the kerf width, which may help resist kickback when traversing the nose. In other embodiments, the end of the bumper portion 22 may extend radially further or less than the depth gauge.

Various embodiments may include proportions of saw chain components having pre-selected values such that while in the first position 12 it may help maintain performance, and while in the second position 14 kickback is minimized. The height of the top edge 23 of bumper portion 22 above the center line 60 of the rivet holes 38 may be indicated as the height of the tip 25, and may be altered as desired to improve performance, decrease kickback and improve maintainability of the chain. In various embodiments, the tip height may be a predetermined percentage of the depth gauge height 34 such as, a range of 80-100%. In further embodiments, the tip height may be kept below the height of the depth gauge height, which may reduce the need for maintenance (e.g. filing) on the tail throughout the life of the saw chain.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A saw chain comprising:
   a cutting link, comprising:
      a forward cutting link rivet hole;
      a rearward cutting link rivet hole;
      an upper cutting edge disposed at a first height relative to a line colinear with lowermost sections of the cutting link and parallel with a line bisecting the forward cutting link rivet hole and the rearward cutting link rivet hole;
      a depth gauge opposing the cutting edge, the depth gauge having an upper surface disposed at a second height generally at or below the first height;
      a gullet formed between the cutting edge and the depth gauge; and
   a drive link, comprising
      a forward drive link rivet hole; and
      a rearward drive link rivet hole, the drive link coupled to the cutting link via a rivet engaging the forward cutting link rivet hole and the rearward drive link rivet hole, a chain pitch defined as half a distance between a center of the forward drive link rivet hole and a center of the rearward cutting link rivet hole, wherein a ratio between the first height and the chain pitch is selected to provide a saw chain for a specified power range, wherein the ratio between the first height and the chain pitch is between about 1.22 and about 1.28.

2. The saw chain of claim 1, wherein the first height is between about 0.400 and about 0.412 inches.

3. The saw chain of claim 1, wherein the chain pitch is between about 0.315 and about 0.335 inches.

4. The saw chain of claim 1, wherein the specified power range is 1 to 3 horsepower.

5. The saw chain of claim 1, wherein the upper cutting edge is disposed at a third height relative to the line bisecting the forward cutting link rivet hole and the rearward cutting link rivet hole, wherein a ratio between the third height and the chain pitch is between about 0.86 and about 0.92.

6. The saw chain of claim 5, wherein the third height is between about 0.285 and about 0.295 inches.

7. The saw chain of claim 1, wherein a ratio between the first height and the second height is selected to provide a saw chain, wherein the ratio between the first height and the second height is between about 1.05 and about 1.10.

8. A system, comprising the saw chain of claim 1 and a drive sprocket configured to drive the saw chain.

9. The system of claim 8, further comprising a guide bar configured to guide the saw chain.

10. A powered saw, comprising the saw chain of claim 1.

11. The powered saw of claim 10, further comprising a drive sprocket configured to drive the saw chain.

12. The powered saw of claim 10, further comprising a guide bar configured to guide the saw chain.

* * * * *